United States Patent

Kuroda et al.

[11] Patent Number: 6,083,629
[45] Date of Patent: Jul. 4, 2000

[54] RESIN COMPOSITION AND SHAPED ARTICLE HAVING A LAYER COMPRISING THE SAME

[75] Inventors: Ryuma Kuroda, Ibaraki; Taiichi Sakaya, Takatsuki; Tadatoshi Ogawa, Toyonaka, all of Japan

[73] Assignee: Sumitomo Chemical Company, Limited, Osaka, Japan

[21] Appl. No.: 09/138,087

[22] Filed: Aug. 21, 1998

Related U.S. Application Data

[60] Division of application No. 08/997,324, Dec. 23, 1997, Pat. No. 5,869,573, which is a continuation-in-part of application No. 08/768,621, Dec. 18, 1996, abandoned.

[30] Foreign Application Priority Data

Dec. 19, 1995 [JP] Japan ..................... 7-330334
Aug. 9, 1996 [JP] Japan ..................... 8-211481
Oct. 30, 1996 [JP] Japan ..................... 8-288394

[51] Int. Cl.[7] .................. B32B 27/30; B32B 27/32; B32B 27/34

[52] U.S. Cl. .................. 428/476.9; 428/474.4; 428/476.3; 428/500; 428/515; 428/516; 428/520; 428/522; 428/523

[58] Field of Search ............... 428/476.9, 474.4, 428/476.3, 500, 515, 516, 520, 522, 523; 525/58, 60

[56] References Cited

U.S. PATENT DOCUMENTS

| | | | |
|---|---|---|---|
| 4,644,036 | 2/1987 | Walz et al. | 525/386 |
| 5,064,716 | 11/1991 | Chou et al. | 428/336 |
| 5,068,077 | 11/1991 | Negi et al. | 264/512 |
| 5,208,082 | 5/1993 | Chou | 428/36.6 |

*Primary Examiner*—Ana Woodward
*Attorney, Agent, or Firm*—Pillsbury Madison & Sutro LLP

[57] ABSTRACT

A resin composition comprising 2 to 30 wt. parts of polyaminoamide and 98 to 70 wt. parts of a saponified ethylene-vinyl ester copolymer which comprises 20 to 60% of ethylene units based on the whole monomeric units and has a saponification degree for the vinyl ester units of at least 90%, and a shaped article comprising this resin composition.

13 Claims, No Drawings ns and SHAPED ARTICLE HAVING A LAYER COMPRISING THE SAME

This is a division of application No. 08/997,324, filed Dec. 23, 1997, U.S. Pat. No. 5,869,573, which is a continuation-in-part of 08/768,621filed Dec. 18, 1996, abandoned, respectively.

BACKGROUND OF THE INVENTION

1. Field of the Invention

The present invention relates to a resin composition with good stretchability comprising a saponified ethylene-vinyl ester copolymer and its use. The resin composition of the present invention and a shaped article having a layer comprising such the resin composition have gas barrier properties due to the saponified ethylene-vinyl ester copolymer.

2. Description of the Prior Art

Polyvinylidene chloride (PVDC) is one of resins having good gas barrier properties, and packaging films or sheets having a layer comprising PVDC are widely used. However, the films having the PVDC layer may be avoided because of the inclusion of chlorine atoms.

Saponified ethylene-vinyl ester (EVOH) copolymers are known as the resin materials having good gas barrier properties and transparency. However, it is difficult to produce a film of EVOH, since EVOH has insufficient stretchability.

A known film comprising EVOH is a film obtained by stretching a raw sheet (unstretched sheet) comprising an EVOH layer and a polyamide (PA) layer having resistance to pin-hole formation (flexibility) which is laminated on the EVOH layer (see JP-A-52-115880). Still, the sufficiently stretched film has not been obtained since EVOH has the insufficient stretchability.

JP-A-53-88067 and JP-A-59-20345 disclose resin compositions comprising EVOH and various plasticizers, but those compositions have drawbacks such as significant decrease of the gas barrier properties, bleeding of the plasticizers, and the like.

Compositions comprising EVOH and PA, which are disclosed in JP-A-52-141785, JP-A-58-154755, JP-A-58-36412, JP-B-44-24277, JP-B-60-24813 and JP-A-58-129035, have a drawback that a large amount of gel forms in the composition.

A composition comprising EVOH and other thermoplastic resin (e.g. ethylene-acrylate copolymers) disclosed in JP-A-61-220839 has insufficient transparency.

JP-A-61-233537 discloses a multilayer container produced by blowing a laminate comprising an EVOH layer and a pair of layers made of ethylene-a-olefin copolymer which are laminated on respective surfaces of the EVOH layer. However, this container has streaks caused by stretching irregularity of EVOH and therefore unsatisfactory appearance.

SUMMARY OF THE INVENTION

An object of the present invention is to provide a resin composition comprising EVOH which has good stretchability.

Another object of the present invention is to provide a shaped article having a layer comprising EVOH which has good stretchability.

Accordingly, the present invention provides a resin composition comprising 2 to 30 wt. parts of polyaminoamide and 98 to 70 wt. parts of a saponified ethylene-vinyl ester copolymer which comprises 20 to 60% of ethylene units based on the whole monomeric units and has a saponification degree for the vinyl ester units of at least 90%.

The resin composition of the present invention has good stretchability, flexibility and resistance to pin-hole formation, and therefore can be used in various applications.

Furthermore, the present invention provides a shaped article having at least one layer comprising the above resin composition according to the present invention.

The shaped article may be a single layer article or a multilayer article comprising at least one layer of the resin composition of the present invention and at least one layer of other resin.

A shape of the article is not limited and may be a film, sheet, tube, cup, bottle, bag, inner container for a bag-in-box, and the like.

The multilayer article can have various additional functions such as heat-sealability depending on the properties of the other resin for the layer which is laminated on the layer of the resin composition of the present invention.

DETAILED DESCRIPTION OF THE INVENTION

The resin composition of the present invention comprises 2 to 30 wt. parts of polyaminoamide and 98 to 70 wt. parts of a saponified ethylene-vinyl ester copolymer which comprises 20 to 60% of ethylene units based on the whole monomeric units and has a saponification degree for the vinyl ester units of at least 90%.

Hereinafter, the polyaminoamide and saponified ethylene-vinyl ester copolymer will be referred to as "PAA" and "EVOH", respectively.

PAA comprises polycarboxylic acid units and polyamine units which are bonded each other, and is obtained by copolymerizing a polycarboxylic acid and a polyamine.

Polycarboxylic acid is a carboxylic acid having at least two carboxyl groups in a molecule and includes a dicarboxylic acid, a tricarboxylic acid, and the like, among which the dicarboxylic acid is preferable. Specific examples of dicarboxylic acid are aliphatic dicarboxylic acids such as malonic acid, succinic acid, glutaric acid, adipic acid, pimelic acid, suberic acid, azelaic acid, sebacic acid, dodecanedioic acid, tetradecanedioic acid, hexadecanedioic acid, octadecanedioic acid, octadecenedioic acid, eicosanedioic acid, eicosenedioic acid, docosanedioic acid, 2,2,4-trimethyladipic acid, polymerized natural fatty acids (e.g. polymers of soybean oil fatty acid, safflower oil fatty acid, tall oil fatty acid, etc.) and the like; alicyclic dicarboxylic acids such as 1,4-cyclohexanedicarboxylic acid and the like; and aromatic dicarboxylic acids such as terephthalic acid, isophthalic acid, phthalic acid, xylenedicarboxylic acid and the like. Among them, the aliphatic dicarboxylic acids, in particular, adipic acid, azelaic acid and polymerized natural fatty acids are preferable.

The polyamine is an amine having at least two amino and/or imino groups in a molecule. Examples of the polyamine are polyalkylenepolyamines such as diethylenetriamine, triethylene-tetramine, tetraethylenepentamine, iminobispropylamine, spermine, spermidine, bis(hexamethylene)triamine and the like. Among them, diethylenetriamine, triethylenetetramine, tetraethylenepentamine and bis(hexamethylene)triamine are preferable.

In addition, one or more monocarboxylic acids in an amount of 20 mole % or less of the polycarboxylic acid and/or one or more monoamines in an amount of 20 mole % or less of the polyamine may be used in the copolymerization of the polycarboxylic acid and polyamine for adjusting the polymerization degree, and the like.

Examples of the monocarboxylic acid are aliphatic monocarboxylic acids such as acetic acid, propionic acid, butyric acid, valeric acid, caproic acid, enanthic acid, caprylic acid, capric acid, pelargonic acid, undecanoic acid, lauric acid, tridecanoic acid, myristic acid, myristoleic acid, palmitic acid, stearic acid, oleic acid, linolic acid, arachic acid, behenic acid, and natural fatty acids (e.g. soybean oil fatty acid, safflower oil fatty acid, tall oil fatty acid, etc.) and the like; alicyclic monocarboxylic acids such as cyclohexanecarboxylic acid, methylcyclohexanecarboxylic acid and the like; and aromatic monocarboxylic acids such as benzoic acid, toluic acid, ethylbenzoic acid, phenylacetic acid and the like.

Examples of the monoamine are aliphatic monoamines such as methylamine, ethylamine, propylamine, butylamine, pentylamine, hexylamine, heptylamine, octylamine, 2-ethylhexylamine, nonylamine, decylamine, undecylamine, dodecylamine, tridecylamine, tetradecylamine, pentadecylamine, hexadecylamine, octadecylamine, eicosylamine, docosylamine and the like; alicyclic monoamines such as cyclohexylamine, methylcyclohexylamine and the like; and aromatic monoamines such as benzylamine, ,β-phenylamine and the like.

The amine value of PAA is preferably between 100 and 550, more preferably between 150 and 500 when measured according to JIS K 7237, in view of the stretchability at low temperature and resistance to bleeding. The resin composition comprising PAA having such the amine value is suitable for the formation of films having good heat shrinkable properties at low temperature.

The content of the ethylene units in EVOH to be used according to the present invention is between 20 and 60%, preferably between 20 and 45%, more preferably between 25 and 40% of the number of the whole monomeric units of EVOH, in view of the oxygen gas barrier properties of the resin composition.

Examples of the vinyl ester monomers which form the vinyl ester units in EVOH are vinyl acetate, vinyl propionate, vinyl versatate, vinyl pivalate and the like. Among them, vinyl acetate and vinyl pivalate are preferable.

The saponification degree for the vinyl ester units is at least 90%, preferably at least 95%, more preferably at least 98%. The thermal stability of EVOH decreases when the saponification degree is less than 90%.

Herein, the saponification degree for the vinyl ester units is a percentage of the number of saponified vinyl ester units based on the total number of the unsaponified and saponified vinyl ester units. The saponification degree can be obtained from an IR spectrum.

Preferably, EVOH has a melt flow rate (MFR) of between 0.1 and 25 g/10 minutes according to JIS K 7210 (210° C., 2.16 kg).

EVOH may contain a minor amount (for example, 0 to 5 mole %) of at least one other polymerizable compound such as α-olefins (e.g. propylene, isobutene, 4-methylpentene-1, hexene, octene, etc.); unsaturated carboxylic acids (e.g. itaconic acid, methacrylic acid, acrylic acid, maleic acid, etc.) and their salts, partial or complete esters, nitrites, amides or anhydrides; vinylsilane compounds (e.g. vinyltrimethoxysilane, etc.); unsaturated sulfonic acids and their salts; alkylthiols, N-vinylpyrrolidone, and the like.

Two or more kinds of EVOH having different ethylene unit contents and/or different degrees of saponification may be used.

The weight ratio of PAA to EVOH in the resin composition of the present invention is usually between 2:98 and 30:70, preferably between 5:95 and 20:80 in view of the stretch-ability, flexibility (resistance to pin-hole formation) and gas barrier properties.

The oxygen permeability of the resin composition of the present invention is preferably between 0.01 and 200 cc/m$^2$.day.atm per 15 µm of thickness at 23° C. under dry conditions.

The resin composition of the present invention may contain one or more additives such as other thermoplastic resins, rubbers, plasticizers, stabilizers, UV ray absorbers, antioxidants, fillers, antistatic agents, nucleators, colorants, lubricants and the like, unless the effects of the present invention are deteriorated.

It is effective for the prevention of gel formation to add at least one agent selected from hydrotalcite compounds, hindered phenol stabilizers, hindered amine stabilizers and metal salts of higher aliphatic carboxylic acids (e.g. calcium stearate, magnesium stearate, etc.) in an amount of between 0.01 to 1 wt. % based on the weight of the resin composition.

The resin composition of the present invention can be prepared by compounding PAA, EVOH and the optional ingredients and additives by any conventional method. For example, the resin composition may be prepared in the form of pellets by melt kneading PAA and EVOH and extruding the mixture with a conventional single or twin screw extruder. When PAA is a highly viscous fluid or in the form of a solution in water or organic solvents, PAA or its solution is pumped in the extruder barrel through an inlet provided in the intermediate section of the barrel which melt kneads EVOH and then PAA and EVOH are melt kneaded, or the pellets of EVOH and PAA or its solution are blended with a mixer such as a Henschel mixer and supplied into and kneaded in the extruder. Alternatively, pellets of the preformulated master batch containing a high concentration of PAA in the matrix of EVOH is compounded with an additional amount of EVOH and kneaded so that the final weight ratio of PAA to EVOH falls in the above defined range. The preparation of the resin composition and its shaping can be performed continuously.

The resin composition of the present invention can be shaped in the form of a film, sheet, tube, cup, bottle, bag, inner container for a bag-in-box and the like by various processing methods. The shaped article may be a single layer article or a multilayer article having at least one layer of the resin composition of the present invention and at least one layer of other resin or resin composition.

Two or more layers of the resin compositions of the present invention may have the same or different compositions, and they may be adjacent to each other or separated by the layer of other resin. Also, two or more layers of the other resins may have the same or different compositions.

For example, the film, sheet or tube can be produced by a conventional stretching method such as uniaxial stretching, zone stretching, flat sequential stretching, simultaneous biaxial stretching, tubular stretching and the like. The multilayer film or sheet can be produced by coextrusion, melt coating, extrusion laminating, dry lamination and the like. The articles having other shapes can be produced by, for example, thermoforming, injection molding, blowing, extrusion blowing and the like.

The shaped articles are preferably used as packages for foods, retort foods (boil-in-the-bag foods), medical products or electronic elements, or containers for fuels such as gasoline or kerosene.

The other resin used for the production of multilayer articles is selected according to the end use of the articles or the properties required for the articles.

Examples of the other resins are thermoplastic resins such as polyolefins (e.g. polyethylene, polypropylene, polybutene, etc.), copolymers comprising olefins, polystyrene, polyethylene terephthalate, polycarbonate, polyamide, ethylene-vinyl alcohol copolymer, polyvinylidene chloride, and mixtures thereof. Among them, polyethylene, polypropylene and their mixtures are preferred.

A layer of an adhesive resin is preferably interposed between the adjacent layers of the multilayer articles to increase the adhesion force between the adjacent layers. The kind of adhesive resin is not limited as long as it can prevent peeling off of the layers during the use of the articles.

Typical examples of the adhesive resin are modified olefin polymers having carboxyl groups. The modified olefin polymer may be prepared by chemically bonding an unsaturated carboxylic acid or its anhydride to polyolefin (e.g. low density polyethylene (LDPE), linear low density polyethylene (LLDPE), polypropylene, polybutylene, etc.) or a copolymer of an olefin and an unsaturated monomer (e.g. vinyl ester, unsaturated carboxylate, etc.) through the addition or grafting reaction. Preferable examples of the modified olefin polymers are polyethylene, polypropylene, ethylene-ethyl acrylate copolymer and ethylene-vinyl acetate copolymer to which maleic anhydride is grafted, and their mixtures.

A blend of the adhesive resin having the acid group and an olefin resin having no acid group may be used.

The laminated articles may have one or more regrind layers comprising regrinds such as trim scraps.

Now, multilayer films will be explained as examples of the multilayer articles having at least one layer comprising the resin composition of the present invention.

The resin composition of the present invention can be used for the production of a multilayer film comprising a layer of the resin composition of the present invention (gas barrier layer) and a layer of other resin. For example, such the multilayer film having the gas barrier properties can be produced by forming an unstretched sheet comprising the layer of the resin composition of the present invention and the layer of other resin, and then stretching the sheet.

Among the resin compositions of the present invention, those having the oxygen permeability of 50 cc/m$^2$.day.atm or less per 15 μm of thickness at 23° C. under dry conditions are preferably used.

The other resin may be the above described thermoplastic resin. In general, the multilayer film having the gas barrier properties and good heat shrinkable properties at low temperature can be obtained, when the other resin having the stretchability at low temperature (about 50 to 100° C.) which is equal to or better than that of the resin composition of the present invention is selected. However, the multilayer film having the good heat shrinkage properties at low temperature may be obtained depending on the processing methods even when the other resin having the inferior stretchability to that of the resin composition of the present invention is used.

In a preferred example of the processing method, the unstretched multilayer film is stretched while heating the film to generate a temperature gradient across the film thickness so that the layer having the lower stretchability is kept at a higher temperature while the layer having the higher stretchability is kept at a lower temperature.

The multilayer film having good heat sealability can be obtained when a layer of a resin having heat sealability is formed as the outermost layer of the multilayer film. In general, polyolefin resins are used as the resins having the heat sealability. Examples of such the polyolefin resins are low density polyethylene (LDPE), ionomer resins or their precursors, linear ethylene-α-olefin copolymers [e.g. linear low density polyethylene (LLDPE), very low density polyethylene (VLDPE), ultra low density polyethylene (ULDPE), etc.] and ethylene-vinyl acetate copolymers. Furthermore, polyolefin resins prepared using metallocene catalysts (single site catalysts) are suitable.

The metallocene catalyst contains a compound which comprises a tetravalent transition metal such as titanium, zirconium, nickel, palladium, hafnium, platinum and the like to which at least one cyclopentadienyl ring or its homolog is coordinated. The metallocene catalyst is also called as a single site catalyst since its catalytically active sites have the same properties.

The layer of the heat sealable resin in the multilayer film may be made easily peelable. In this case, ionomer resins and/or ethylene-methacrylic acid copolymers (EMAA) which contain blended polypropylene are used as the heat sealable resins.

The multilayer film according to the present invention may have the above adhesive resin layer or a layer of a following resin for reinforcing between the gas barrier layer of the resin composition of the present invention and the other layer.

The reinforcing resin is preferably polyamide. Examples of the polyamide include homopolyamides such as 6-Nylon, 6, 66-Nylon, 6,12-Nylon, MXD, 6-Nylon (m-xylenediamine adipate), etc.; copolyamides such as caprolactam-hexamethylenediamine adipate copolymers, caprolactam-lauryllactam copolymers, lauryllactam-hexamethylenediammonium adipate copolymers, hexamethylene-diammonium adipate-hexamethylenediammonium sebacate copolymers, ethylenediammonium adipate-hexamethylenediammonium adipate copolymers, caprolactam-hexamethylene-diammonium adipate-hexamethylenediammonium sebacate copolymers, etc.; and amorphous polyamides such as 6/6T copolymer, 6/6I copolymers, etc. They may be used as a blend of two or more of them.

The thicknesses of the multilayer film and each layer constituting the multilayer film are determined depending on the functions required for the film, and other factors.

When the multilayer film is a heat-shrinkable one, the whole thickness of the film is usually between 10 and 100 μm, preferably between 15 and 60 μm, and the thickness of the gas barrier layer is usually between 1 and 10 μm, preferably between 1 and 5 μm.

When the adhesive resin layer is present, its thickness is usually between 2 and 20 μm, preferably between 5 and 15 μm.

The total thickness of the layers of the other resins is between 35 and 90%, preferably between 40 and 90% of the whole thickness of the multilayer film.

The outermost layer of the multilayer film preferably contains an anti-fogging agent (or anti-misting agent) to prevent clouding of the multilayer film caused by adhesion of water droplets onto the film. Preferably, the anti-fogging agent is one having good compatibility to the resin which constitutes the layer containing the anti-fogging agent. Specific examples of the anti-fogging agent are fatty acid esters with polyhydric alcohols such as sorbitan fatty acid esters, glycerol fatty acid esters, polyglycerol fatty acid esters, propyleneglycol fatty acid esters, etc.; ethylene oxide additives such as polyoxyethylene sorbitan esters, and the like.

The amount of the optionally used anti-fogging agent is usually between 0.05 and 3 wt. % based on the weight of the resin in the layer containing the anti-fogging agent.

The multilayer film may be produced by a per se conventional film stretching method such as uniaxial stretching, zone stretching, flat sequential stretching, simultaneous biaxial stretching, inflation stretching (tubular stretching) and the like. Among them, the inflation stretching is preferred in view of the equipment costs. The resin composition of the present invention comprising PAA and EVOH is suitable for the inflation stretching, since the inflation stretching requires a raw material sheet having better stretchability than other stretching methods.

The multilayer film can be produced by employing the biaxial inflation method disclosed in JP-A-53-82888 as follows:

First, The resin and/or resin compositions which constitute the layers of the multilayer film are coextruded downward from an annular die of an extruder in the form of a tubular body having a multilayer structure. In this step, a liquid material (a pile agent) is supplied in a hollow portion of the tubular body to prevent the adhesion of facing parts of the inner wall of the body. Hereinafter, the tubular body will be referred to as "tube" irrespective of its shape.

Then, the tube is cooled in the cooling bath kept at a temperature of 20° C. or less and located directly below the die, and withdrawn in a folded state while squeezing the pile agent from the tube with a first pair of nip rolls provided in the cooling bath. The folded tube is then placed in a hot water bath kept at a temperature between 50 and 95° C. or hot air. Thereafter, the tube is simultaneously biaxially stretched in the machine (longitudinal) and cross (diameter) directions between a second pair of nip rolls and a third pair of nip rolls which rotate at a rotation speed three times higher than that of the second pair of nip rolls while cooling the tube at room temperature and continuously blowing air into the tube. The stretching temperature is suitably selected depending on the kinds of the resins used. Draw ratios are between about 1.5 and 5 times, preferably between about 2.5 and 3.5 times both in the machine and cross directions.

The multilayer film produced by the above inflation stretching method may be heat set at a suitable temperature, if necessary.

The above produced multilayer film has the heat shrinking properties such that an average value of the shrinkage factors in the machine and cross directions is at least 20%, when heated at 75° C. for one minute. The shrinkage factor is a percentage of the shrunk amount (the difference between the original (unshrunk) length and the length after shrinking) per the original length.

When an article is packaged with the tubular multilayer film having the heat sealability and heat shrinkability, for example, a heat shrinking packaging apparatus comprising a conventional pillow type packaging machine and heat shrinking tunnel which are connected in series can be employed. Such the apparatus achieves the high speed packaging.

EXAMPLES

The present invention will be illustrated by the following examples, which do not limit the scope of the present invention in any way.

The properties in Examples 1–6 and Comparative Examples 1–3 were measured as follows:

Oxygen permeability

The oxygen permeability was measured according to JIS K 7126. That is, a sample film was set in a commercial oxygen permeability meter (OX-TRAN 10/50 A (trade name) manufactured by MOCOM, USA), and the oxygen permeability was continuously measured at 23° C. under dry conditions. The value obtained after the oxygen permeability became substantially constant was used as the oxygen permeability for the specific film. It took several hours to three days from the start of measurement before the stabilization of the measured value of oxygen permeability.

Stretchability

The stretchability was evaluated from an SS curve obtained in the tensile test under heating and also by the biaxial stretching test using a bench biaxial stretching tester.

(1) SS curve

A resin composition was heat pressed at 200° C. for 3 minutes, and then cold pressed at 30° C. for 5 minutes, and a sheet having a thickness of 300 $\mu$m was obtained. The obtained sheet was blanked in the shape of the JIS No. 1 dumbbell and used as a test sample.

The test sample was pulled at a rate of 1000 mm/min. using a temperature-control autograph (AGS 500 D manufactured by Shimadzu Corporation), and an SS curve was depicted. The SS curve shows a relationship between a strain and a stress. The larger elongation at break or the smaller tensile stress at yield indicate better stretchability.

(2) Biaxial stretching test

A square sample sheet (92 mm×92 mm) was stretched with the bench biaxial stretching tester at a stretching rate of 5 m/min. at draw ratios of 3×3 times. Since the temperature control below 70° C. was difficult, the stretching was started when the temperature indicator for the blower indicated the desired temperature by monitoring the temperature indicator.

The condition of the stretched sample sheet, that is, occurrence of breakage or crack of the intermediate layer was visually inspected and ranked according to the following criteria:

4: Neither break nor crack appeared, and the condition was very good

3: Few breakages or cracks appeared, and the condition was good

2: Breakages and cracks appeared, and the condition was poor

1: Many breakages and cracks appeared, and the condition was bad.

EXAMPLE 1

EVOH comprising 44% of ethylene units based on the whole monomeric units and having the saponification degree for the vinyl ether units of 98% or more (EP-E 105B manufactured by KURARAY, hereinafter referred to as "EVOH-E") was melt kneaded with a twin-screw extruder (the 40 mm$\phi$ extruder BT-40-S2-60-L manufactured by PLASTIC ENGINEERING KABUSHIKIKAISHA, L/D= 60), and a 50 wt. % aqueous solution of a polyaminoamide obtained by polymerization of adipic acid and diethylenetriamine (referred to as "PAA-1") (this solution being available under the trade name of SUMIREZ RESIN IM 60 from Sumitomo Chemical Co., Ltd.) was charged in the barrel of the extruder using a pump for supplying liquids.

Then, the mixture was extruded at an extrusion temperature of 200° C. at an extrusion rate of 13 kg/hr. while removing water from a vent hole provided in the middle section of the barrel, and pellets of the resin composition were obtained.

The weight ratio of PAA-1 to EVOH-E in the resin composition was 10:90.

The amine value of PAA-1 measured according to JIS K 7237 was 297.

The SS curve was recorded with this resin composition.

A three-layer film having a width of 300 mm and consisting of an intermediate layer of the above resin composition (having the thickness of 65 μm), and inner and outer layers of an ethylene-vinyl acetate copolymer (H 2081 manufactured by Sumitomo Chemical Co., Ltd., the content of vinyl acetate units: 16 wt. %, MFR: 2 g/10 min.) (each having the thickness of 173 μm) was produced by the T-die sheet molding method. The three-layer film was subjected to the biaxial stretching test. Also, the oxygen permeability of the stretched film, which was obtained by stretching the three-layer film at a bath temperature of 60° C., a blower temperature of 73° C. at draw ratios of 3.0×3.0, was measured.

The results are shown in Table 1.

EXAMPLE 2

The resin composition was prepared and the stretchability of the resin composition and three-layer film, and oxygen permeability of the stretched film were evaluated in the same manner as in Example 1 except that the weight ratio of PAA-1 to EVOH-4 was changed to 15:85.

The results are shown in Table 1.

EXAMPLE 3

The resin composition was prepared and the stretchability of the resin composition and three-layer film, and oxygen permeability of the stretched film were evaluated in the same manner as in Example 1 except that the weight ratio of PAA-1 to EVOH-4 was changed to 20:80.

The results are shown in Table 1.

EXAMPLE 4

A polyaminoamide (TOHMIDE #225-X manufactured by FUJI CHEMICAL Co., Ltd., obtained by the polymerization of a polymerized tall oil fatty acid and triethylenetetramine) (referred to as "PAA-2") and EVOH-E were mixed in a weight ratio of 10:90 (PAA-2:EVOH-E) with a Henschel mixer, and the mixture was charged and kneaded in a twin-screw extruder and extruded to obtain pellets. PAA-2 had the viscosity of between 8,000 and 12,000 mPa.s at 40° C. and the amine value of 340 according to JIS K 7237.

Then, the stretchability of the resin composition and three-layer film, and oxygen permeability of the stretched film were evaluated in the same manner as in Example 1.

The results are shown in Table 1.

EXAMPLE 5

The resin composition was prepared and the stretchability of the resin composition and three-layer film, and oxygen permeability of the stretched film were evaluated in the same manner as in Example 4 except that a polyaminoamide (TOHMIDE #235-A manufactured by FUJI CHEMICAL Co., Ltd., obtained by the polymerization of a polymerized tall oil fatty acid and triethylenetetramine) (referred to as "PAA-3") was used in place of PAA-2. PAA-3 had the viscosity of between 8,000 and 18,000 mPa.x at 25° C. and the amine value of 390 according to JIS K 7237.

The results are shown in Table 1.

EXAMPLE 6

The resin composition was prepared and the stretchability of the resin composition and three-layer film, and oxygen permeability of the stretched film were evaluated in the same manner as in Example 4 except that a polyaminoamide (TOHMIDE #245-X manufactured by FUJI CHEMICAL Co., Ltd., obtained by the polymerization of a polymerized tall oil fatty acid and triethylenetriamine) (referred to as "PAA-4") was used in place of PAA-2. PAA-4 had the viscosity of between 1,500 and 3,000 mPa.x at 25° C. and the amine value of 455 according to JIS K 7237.

The results are shown in Table 1.

COMPARATIVE EXAMPLE 1

The stretchability of EVOH alone and three-layer film using EVOH in place of the resin composition of PAA-1 and EVOH, and oxygen permeability of the stretched film were evaluated in the same manner as in Example 1.

The results are shown in Table 1.

COMPARATIVE EXAMPLE 2

The resin composition was prepared and the stretchability of the resin composition and three-layer film was evaluated in the same manner as in Example 1 except that Nylon 6/66 (UBE NYLON 5023 FD manufactured by UBE KOSAN) was used in place of PAA-1 and the weight ratio of Nylon 6/66 to EVOH-4 was 10:90.

The results are shown in Table 1.

COMPARATIVE EXAMPLE 3

The resin composition was prepared and the stretchability of the resin composition and three-layer film was evaluated in the same manner as in Comparative Example 2 except that Nylon 6/12 (UBE NYLON 7024 B manufactured by UBE KOSAN) was used in place of Nylon 6/66.

The results are shown in Table 1.

TABLE 1

| | Resin composition | | Tensile test | | Biaxial stretching test | | | | | | | | |
|---|---|---|---|---|---|---|---|---|---|---|---|---|---|
| | | | | | Temp. in bath | | | | | | | | |
| | | | | | 60° C. | | 50° C. | | 40° C. | | 35° C. | | |
| | | | | | Blower temp. | | | | | | | | |
| | | | | | 73° C. | | 55° C. | | 50° C. | | 45° C. | | |
| | | | Tensile | Elongation | Draw ratios | | | | | | | | |
| Ex. No. | EVOH-E content (wt. %) | PAA (wt. %) | stress at yield (kg/cm²) | at break (%) | 3.0 × 3.0 | 3.0 × 4.0 | 3.0 × 3.0 | 3.3 × 3.3 | 3.0 × 3.0 | 3.3 × 3.3 | 3.0 × 3.0 | 3.2 × 3.2 | Oxygen Permeability (cc/m².day.atom) |
| 1 | 90 | PAA-1 (10) | 256 | 557 | 4 | 3 | 3 | 3 | 3 | 3 | 2 | 1 | 3.5 |
| 2 | 85 | PAA-1 (15) | 209 | 670 | 4 | 3 | 4 | 3 | 4 | 3 | 2 | 1 | 2.3 |
| 3 | 80 | PAA-1 (20) | 168 | 847 | 4 | 4 | 4 | 4 | 4 | 4 | 4 | 3 | 2.0 |
| 4 | 90 | PAA-2 (10) | 219 | 508 | 4 | 3 | 4 | 3 | 4 | 3 | 2 | 1 | 15.0 |
| 5 | 90 | PAA-3 (10) | 209 | 566 | 4 | 3 | 4 | 3 | 4 | 3 | 2 | 1 | 15.0 |
| 6 | 90 | PAA-4 (10) | 201 | 551 | 4 | 3 | 4 | 3 | 4 | 3 | 2 | 1 | 30.7 |
| C. 1 | 100 | — (0) | 370 | 61 | 3 | 1 | 1 | 1 | 1 | 1 | 1 | 1 | 5.0 |
| C. 2 | 90 | Ny6/66 (10) | 338 | 104 | 3 | 1 | 2 | 1 | 1 | 1 | 1 | 1 | |
| C. 3 | 90 | Ny6/12 (10) | 337 | 83 | 3 | 1 | 2 | 1 | 1 | 1 | 1 | 1 | |

The properties in Examples 7–10 and Comparative Examples 4–6 were measured as follows:

Heat shrinkage factor

A square sample film (100 mm×100 mm) was immersed in water kept at 75° C. for one minute, and then the lengths in the machine and cross directions were measured, and the shrinkage factor in each direction was calculated. The average value of the shrinkage factors in the two directions was used as the shrinkage factor in these examples.

Oxygen permeability

The oxygen permeability was measured in the same manner as in Examples 1–6 and.Comparative Examples 1–3.

EXAMPLE 7

An unstretched raw sheet having the layer structure of outer layer/adhesive layer/core layer/adhesive layer/outer layer was produced as follows:

The ethylene-butene-1 copolymer having the density of 0.895 g/cm³, melting point of 100° C., MFR of 2 g/10 min. and butene-1 unit content of 13 wt. % was used as the outer layer material, the pellet-form resin composition containing EVOH-E and PAA-1 which had been prepared in the same manner as in Example 1 was used as the core layer material, and polypropylene grafted with maleic anhydride was used as the adhesive layer material.

The unstretched tube was produced by co-extruding the above materials from a die for co-extruding a three-kind five-layer film having a diameter of 200 mm using an extruder having a screw diameter of 65 mm for the outer layers, an extruder having a screw diameter of 40 mm for the core layer, and an extruder having a screw diameter of 50 mm for the adhesive layer. The unstretched tube had the wall thickness of about 170 μm and the width of 310 mm (in the flattened state), and the thickness ratio (%) of the layers was 25/20/10/20/25.

The unstretched tube was heated to 60° C. and stretched by the inflation biaxial stretching method at draw ratios of 3.5 times in the machine direction and 3.2 times in the cross direction, followed by heat setting while relaxing the film slightly, and a tube-form stretched film having a wall thickness of about 17 μm was obtained.

The film had the oxygen permeability of 20 cc/m².day.atm. and the heat shrinkage factor of 33% (35% and 31% in the machine and cross directions, respectively). These oxygen permeability and heat shrinkage factor are both excellent.

The oxygen permeability for the core layer per 15 μm thickness was 2.3 cc/m².day.atm.

EXAMPLE 8

The stretched film was produced in the same manner as in Example 7 except that the resin composition containing EVOH-E and PAA-3 which had been prepared in the same way as in Example 5 was used.

The film had the oxygen permeability of 120 cc/m².day.atm. and the heat shrinkage factor of 35% (36% and 34% in the machine and cross directions, respectively). These oxygen permeability and heat shrinkage factor are both excellent.

The oxygen permeability for the core layer per 15 μm thickness was 14 cc/m².day.atm.

COMPARATIVE EXAMPLE 4

The unstretched tube was produced in the same manner as in Example 7 except that EVOH-E alone was used as the core layer material. However, this tube could not be stretched to provide a film having the same thickness as that of the stretched film produced in Example 7, since this tube had bad stretchability.

EXAMPLE 9

The stretched film was produced in the same manner as in Example 8 except that the resin composition containing 98 wt. % of the ethylene-butene-1 copolymer having the density of 0.906 g/cm³, melting point of 108° C., MFR of 2.1 g/10 min. and butene-1 unit content of 5 wt. %, and 2 wt. % of monoglycerol oleate was used as the outer layer material, and the ethylene-propylene copolymer grafted with maleic anhydride was used as the adhesive layer material.

The film had the oxygen permeability of 120 cc/m².day.atm. and the heat shrinkage factor of 33% (35% and 31% in the machine and cross directions, respectively). These oxygen permeability and heat shrinkage factor are both excellent.

The oxygen permeability for the core layer per 15 μm thickness was 14 cc/m².day.atm.

COMPARATIVE EXAMPLE 5

The unstretched tube was produced in the same manner as in Example 9 except that EVOH-E alone as used as the core layer material. However, this tube could not be stretched to provide a film having the same thickness as that of the stretched film produced in Example 9, since this tube had bad stretchability.

EXAMPLE 10

The stretched film was produced in the same manner as in Example 9 except that the thickness ratio of the layers were changed to 20/20/20/20/20.

The film had the oxygen permeability of 60 cc/m².day.atm. and the heat shrinkage factor of 34% (37% and 31% in the machine and cross directions, respectively). These oxygen permeability and heat shrinkage factor are both excellent.

The oxygen permeability for the core layer per 15 μm thickness was 14 cc/m².day.atm.

COMPARATIVE EXAMPLE 6

The unstretched tube was produced in the same manner as in Example 10 except that EVOH-E alone as used as the core layer material. However, this tube could not be stretched to provide a film having the same thickness as that of the stretched film produced in Example 10, since this tube had bad stretchability.

The resistance to pin-hole formation in Examples 11–13 and Comparative Example 7 was evaluated as follows:

The resistance to pin-hole resistance was measured using a Gelbo Flex Tester (manufactured by TOYO SEIKI KABUSHIKIKAISHA).

An A4 size sample piece was rolled up in a cylinder form with its longer side being on the periphery of the cylinder, and both open ends of the cylinder were grasped. Then, the cylinder was pressed in the axis direction of the cylinder with twisting it at an angle of 440 degrees at for 2,000 times at a rate of 40 times/min. Thereafter, the number of the pin-holes formed in the core layer of the sample piece was counted using a magnifier. The smaller number of pin-holes indicates the better resistance to pin-hole formation.

EXAMPLE 11

The pellets of the resin composition were prepared in the same manner as in Example 1, and used as the core layer material for a molded article which was produced as follows:

A five-layered shaped article consisting of the LLDPE layer/adhesive resin layer/core layer/adhesive resin layer/ LLDPE layer was produced by the inflation molding method using a plurality of extruders.

The materials for the layers were as follows:
LLDPE layers:
Ethylene-butene-1 random copolymer having the density of 0.9127 g/cm³ and MFR of 1.0 g/10 min (according to JIS K 6760).
Adhesive resin layer:
Acid-modified polyethylene (ADMER LF 300 manufactured by MITSUI PETROCHEMICAL Co., Ltd. having the density of 0.92 g/cm³ and melting point of 110° C.)

The thickness of the article was 120 μm, and the thicknesses of the layers were 50/5/10/5/50 μm (from the outermost layer to the innermost layer).

The number of pin-holes was 3.

EXAMPLE 12

The molded article was produced in the same manner as in Example 11 except that the resin composition which had been prepared in the same way as in Example 5 was used as the core layer material. The number of pin-holes was 6.

EXAMPLE 13

The pellets of resin composition were produced in the same manner as in Example 1 except that a polyaminoamide (TOHMIDE #427-A manufactured by FUJI CHEMICAL Co., Ltd., obtained by the polymerization of a polymerized tall oil fatty acid and triethylenetetramine) (referred to as "PAA-4") was used as the polyaminoamide. PAA-4 had the viscosity of 75,300 mPa.s at 40° C. and the amine value of 251 according to JIS K 7237.

The molded article was produced in the same manner as in Example 11 except that the resin composition obtained in the above was used as the core layer material.

The number of pin-holes was 8.

COMPARATIVE EXAMPLE 7

The molded article was produced in the same manner as in Example 11 except that EVOH-E alone was used as the core layer material.

The number of pin-holes was 20.

The resistance to pin-hole formation in Example 14 and Comparative Example 8 was evaluated as follows:

The resistance to pin-hole resistance was measured using a Gelbo Flex Tester (manufactured by TOYO SEIKI KABUSHIKIKAISHA) at 23° C., 50 %RH.

An A4 size sample piece was rolled up in a cylinder form with its longer side being on the periphery of the cylinder, and both open ends of the cylinder were grasped. Then, the cylinder was pressed in the axis direction of the cylinder with twisting it at an angle of 440 degrees for 5,000 times at a rate of 40 times/min. Thereafter, the number of the pin-holes formed in the sample piece was counted by an inking test. That is, the sample piece was spread and placed on a sheet of white paper. Then, an amount of an ink was applied on the sample piece, and the number of ink dots which stained the white paper was counted. An average number of pinholes for five sample pieces which were cut out from the same film was used as the result of the test for resistance to pin-hole formation. The smaller average number of pin-holes indicates the better resistance to pin-hole formation.

EXAMPLE 14

The pellets of the resin composition were prepared in the same manner as in Example 5, and used as the core layer material for a molded article which was produced as follows:

A five-layered shaped article consisting of the LLDPE layer/adhesive resin layer/core layer/adhesive resin layer/LLDPE layer was produced by the inflation molding method using a plurality of extruders at a blow-up ratio of 2.

The materials for the layers were as follows:

LLDPE layers:

Ethylene-hexene random copolymer having the density of 0.9127 g/cm$^3$ and MFR of 0.8 g/10 min (according to JIS K 6760).

Adhesive resin layer:

Acrylic acid-modified polyethylene (EAA A211 M manufactured by MITSUBISHI CHEMICAL Co., Ltd. having the density of 0.94 g/cm$^3$ and MFR of 7.0 g/10 min.)

The thickness of the article was 88 μm, and the thicknesses of the layers were 32/9/7/9/32 μm (from the outermost layer to the innermost layer).

The average number of pin-holes was 3.6.

COMPARATIVE EXAMPLE 8

The molded article was produced in the same manner as in Example 14 except that EVOH-E alone was used as the core layer material. The average number of pin-holes was 8.4.

What is claimed is:

1. A shaped article comprising at least one layer which comprises a resin composition comprising 2 to 30 wt. parts of a polyaminoamide which has an amine value in the range between 100 and 550 and is obtained from a dicarboxylic acid and a polyamine having at least three groups selected from the group consisting of amino groups and imino groups in a molecule and 98 to 70 wt. parts of a saponified ethylene-vinyl ester copolymer which comprises 20 to 60% of ethylene units based on the whole monomeric units and has a saponification degree for the vinyl ester units of at least 90%.

2. The shaped article according to claim 1, which is a film.

3. The shaped article according to claim 1, which further comprises at least one layer comprising a polyolefin resin.

4. The shaped article according to claim 1, which further comprises at least one layer comprising at least one polyolefin resin selected from the group consisting of low density polyethylene, ionomer resins, linear low density polyethylene, linear ethylene-α-olefin copolymers, ethylene-vinyl acetate copolymers and polyolefin resins prepared using metallocene catalysts.

5. The shaped article according to claim 1, which is produced by stretching an unstretched sheet having at least one layer which comprises a resin composition comprising 2 to 30 wt. parts of polyaminoamide and 98 to 70 wt. parts of a saponified ethylene-vinyl ester copolymer which comprises 20 to 60% of ethylene units based on the whole monomeric units and has a saponification degree for the vinyl ester units of at least 90%, at draw ratios of between 1.5 and 5 times in machine and cross directions.

6. The shaped article according to claim 1, which is a film having a shrinkage factor of at least 20%, when heated at 75° C. for one minute.

7. The shaped article according to claim 1, wherein said polyamine has three to five groups selected from the group consisting of amino groups and imino groups in a molecule.

8. The shaped article according to claim 1, wherein said polyamine is a polyalkylenepolyamine.

9. The shaped article according to claim 1, wherein said polyamine is at least one polyalkylenepolyamine selected from the group consisting of diethylenetriamine, triethylenetetramine, tetraethylenepentamine, iminobispropylamine, spermine, spermidine and bis (hexamethylene) triamine.

10. The shaped article according to claim 1, wherein said dicarboxylic acid is an aliphatic dicarboxylic acid.

11. The shaped article according to claim 1, wherein said dicarboxylic acid is at least one dicarboxylic acid selected from the group consisting of adipic acid, azelaic acid and polymeric natural fatty acids.

12. The shaped article according to claim 1, wherein said polyamine is diethylenetriamine.

13. The shaped article according to claim 1, wherein said dicarboxylic acid is adipic acid, and said polyamine is diethylenetriamine.

* * * * *